(12) United States Patent
Colombi et al.

(10) Patent No.: US 10,826,322 B2
(45) Date of Patent: Nov. 3, 2020

(54) SYSTEMS AND METHODS FOR GRID INTERACTIVE UPS

(71) Applicant: ABB Schweiz AG, Schenectady, NY (US)

(72) Inventors: Silvio Colombi, Losone (CH); Marco Piemontesi, Biasca (CH)

(73) Assignee: ABB Schweiz AG, Baden (CH)

( * ) Notice: Subject to any disclaimer, the term of this patent is extended or adjusted under 35 U.S.C. 154(b) by 522 days.

(21) Appl. No.: 14/301,518

(22) Filed: Jun. 11, 2014

(65) Prior Publication Data

US 2014/0368043 A1    Dec. 18, 2014

Related U.S. Application Data

(60) Provisional application No. 61/835,122, filed on Jun. 14, 2013.

(51) Int. Cl.
| | |
|---|---|
| *H02J 3/32* | (2006.01) |
| *H02J 9/06* | (2006.01) |
| *H02J 3/18* | (2006.01) |
| *H02J 9/04* | (2006.01) |

(52) U.S. Cl.
CPC ............ *H02J 9/062* (2013.01); *H02J 3/1842* (2013.01); *H02J 3/1864* (2013.01); *H02J 3/32* (2013.01); *H02J 9/04* (2013.01); *H02J 9/061* (2013.01); *Y02E 40/10* (2013.01); *Y02E 40/20* (2013.01)

(58) Field of Classification Search
CPC ........ H02J 7/00; H02J 3/32; H02J 9/06; H02J 9/61; Y10T 307/615; Y10T 307/625
USPC .......................................................... 307/66
See application file for complete search history.

(56) References Cited

U.S. PATENT DOCUMENTS

| | | | |
|---|---|---|---|
| 4,647,837 A | 3/1987 | Stemmler | |
| 5,397,927 A | 3/1995 | Suelzle et al. | |
| 5,648,894 A | 7/1997 | DeDoncker et al. | |
| 5,691,626 A | 11/1997 | Esser et al. | |
| 5,747,887 A | 5/1998 | Takanaga et al. | |
| 5,796,601 A * | 8/1998 | Yamamoto | H02M 7/17 363/84 |
| 6,166,929 A | 12/2000 | Ma et al. | |
| 6,262,899 B1 | 7/2001 | Raddi et al. | |

(Continued)

FOREIGN PATENT DOCUMENTS

| | | |
|---|---|---|
| CN | 1881743 A | 12/2006 |
| CN | 102163843 A | 8/2011 |

(Continued)

OTHER PUBLICATIONS

International Search Report and Written Opinion issued from PCT Application No. PCT/US2014/042208 dated Sep. 10, 2014.

(Continued)

*Primary Examiner* — Rexford N Barnie
*Assistant Examiner* — Swarna N Chowdhuri
(74) *Attorney, Agent, or Firm* — Barnes & Thornburg LLP

(57) ABSTRACT

A grid interactive uninterruptible power supply (UPS) is provided. The grid interactive UPS includes a first path including a rectifier, an inverter coupled in series with the rectifier, and a battery coupled in parallel with the inverter. The grid interactive UPS further includes a second path in parallel with the first path, wherein the grid interactive UPS is operable to supply power from the battery to a grid coupled to an input of the grid interactive UPS.

20 Claims, 9 Drawing Sheets

(56) References Cited

U.S. PATENT DOCUMENTS

| | | |
|---|---|---|
| 6,295,215 B1 | 9/2001 | Faria et al. |
| 6,400,586 B2 | 6/2002 | Raddi et al. |
| 6,661,678 B2 | 12/2003 | Raddi et al. |
| 6,765,452 B2 | 7/2004 | Yuan et al. |
| 6,861,897 B1 | 3/2005 | Cheng et al. |
| 6,882,549 B2 | 4/2005 | Huggett et al. |
| 6,906,933 B2 | 6/2005 | Taimela |
| 6,940,187 B2 | 9/2005 | Escobar et al. |
| 7,035,124 B2 | 4/2006 | Chadwick et al. |
| 7,372,177 B2 | 5/2008 | Colombi et al. |
| 7,468,595 B2 | 12/2008 | Lee et al. |
| 7,508,094 B2 | 3/2009 | Johnson, Jr. et al. |
| 7,881,079 B2 | 2/2011 | Prasad et al. |
| 7,939,968 B2 | 5/2011 | Hjort et al. |
| 8,553,434 B2 | 10/2013 | Coccia et al. |
| 8,853,887 B2 * | 10/2014 | Silberbauer ............... H02J 9/06 307/64 |
| 2004/0084965 A1 | 5/2004 | Welches et al. |
| 2005/0201127 A1 | 9/2005 | Tracy et al. |
| 2006/0226706 A1 * | 10/2006 | Edelen .................... H02J 9/062 307/64 |
| 2008/0027800 A1 | 1/2008 | Schabes et al. |
| 2008/0130332 A1 | 6/2008 | Taimela et al. |
| 2009/0174260 A1 * | 7/2009 | Wu ......................... H02J 9/062 307/65 |
| 2010/0026098 A1 | 2/2010 | Marbach et al. |
| 2010/0080028 A1 * | 4/2010 | Cheng ................. H02M 5/4585 363/126 |
| 2011/0298293 A1 * | 12/2011 | Veltri .................... F16C 39/063 307/84 |
| 2012/0119581 A1 | 5/2012 | Silberbauer et al. |
| 2012/0152586 A1 * | 6/2012 | Frutschy ............. H01M 2/1061 174/51 |
| 2012/0175958 A1 * | 7/2012 | Dighrasker ............. H02J 9/062 307/66 |
| 2013/0002025 A1 | 1/2013 | Wan |
| 2014/0021789 A1 * | 1/2014 | Greer ..................... H02J 9/062 307/64 |
| 2014/0062192 A1 * | 3/2014 | Vichnyakov .............. H02J 3/00 307/26 |
| 2014/0368042 A1 | 6/2014 | Giuntini et al. |
| 2014/0362623 A1 * | 12/2014 | Farkas ...................... H02J 3/32 363/97 |

FOREIGN PATENT DOCUMENTS

| | | | |
|---|---|---|---|
| WO | 2008015502 A1 | 2/2008 | |
| WO | WO 2008015502 A1 * | 2/2008 | ................ H02J 3/32 |

OTHER PUBLICATIONS

International Search Report and Written Opinion issued from PCT Application No. PCT/US2014/042209 dated Sep. 10, 2014.

Wiseman J.C., et al., "Active Damping Control of a High-Power PWM Current-Source Rectifier for Line-Current THD Reduction", IEEE Transactions on Industrial Electronics, vol. 52, No. 3, Jun. 2005.

J. Reese et al, FRT capability of direct power controlled converters connected by an actively damped LCL-filter for wind power applications, EPE—ECCE 2011 conference.

W. Hosny et al, Investigation of shunt active power filters in railway systems, substation installation, EPQU 2011 conference.

Machine translation of Chinese Search Report issued in connection with corresponding Chinese Application No. 2014800338631 dated Jul. 20, 2017.

Chinese Intellectual Property Agency, Office Action for CN 2014800338631, dated Sep. 29, 2018, 13 pages (including English translation).

European Patent Office, Office Action for EP 14735815.4, dated Mar. 9, 2018, 3 pages.

European Patent Office, Office Action for EP 14735815.4, dated Sep. 25, 2018, 2 pages Communication pursuant to Article 94(3) EPC for EP 14735815.4, dated Aug. 9, 2019, 4 pages.

* cited by examiner

SYSTEMS AND METHODS FOR GRID INTERACTIVE UPS

CROSS REFERENCE TO RELATED APPLICATIONS

This application is a non-provisional application and claims priority to U.S. Provisional Patent Application Ser. No. 61/835,122 filed Jun. 14, 2013 for "CONTROL SYSTEM FOR MULTI-USE MULTI-MODE UPS", which is hereby incorporated by reference in its entirety.

BACKGROUND

The field of the invention relates generally to uninterruptible power supplies, and more particularly, to grid interactive uninterruptible power supplies.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

As energy consumption outpaces energy supply, power quality and stability problems may be encountered. Further, energy costs may increase during periods of peak demand. Moreover, at least some renewable energy generation systems (e.g., photovoltaic, wind power) may present additional grid stability problems. Accordingly, to protect sensitive equipment against power quality events (e.g., outages, swells, sags, noise, etc.), UPSs are utilized to provide reliability.

BRIEF DESCRIPTION

In one aspect, a grid interactive uninterruptible power supply (UPS) is provided. The grid interactive UPS includes a first path including a rectifier, an inverter coupled in series with the rectifier, and a battery coupled in parallel with the inverter. The grid interactive UPS further includes a second path in parallel with the first path, wherein the grid interactive UPS is operable to supply power from the battery to a grid coupled to an input of the grid interactive UPS.

In another aspect, a power system is provided. The power system includes a grid, a load, and at least one grid interactive uninterruptible power supply (UPS) coupled between the grid and the load. The at least one grid interactive UPS includes a first path including a rectifier, an inverter coupled in series with the rectifier, and a battery coupled in parallel with the inverter. The at least one grid interactive UPS further includes a second path in parallel with the first path, wherein the grid interactive UPS is operable to supply power from the battery to the grid.

In yet another aspect, a method of operating a power system is provided. The method includes coupling a grid interactive uninterruptible power supply (UPS) between a grid and a load, wherein the grid interactive UPS includes a first path including a rectifier, an inverter coupled in series with the rectifier, and a battery coupled in parallel with the inverter, and a second path in parallel with the first path. The method further includes supplying power from the battery to the grid.

DETAILED DESCRIPTION

Exemplary embodiments of a grid interactive uninterruptible power supply (UPS) are described herein. An exemplary grid interactive UPS includes a first path including a rectifier, an inverter coupled in series with the rectifier, and a battery coupled in parallel with the inverter. The grid interactive UPS further includes a second path in parallel with the first path, wherein the grid interactive UPS is operable to supply power from the battery to a grid coupled to an input of the grid interactive UPS.

Figure 1:
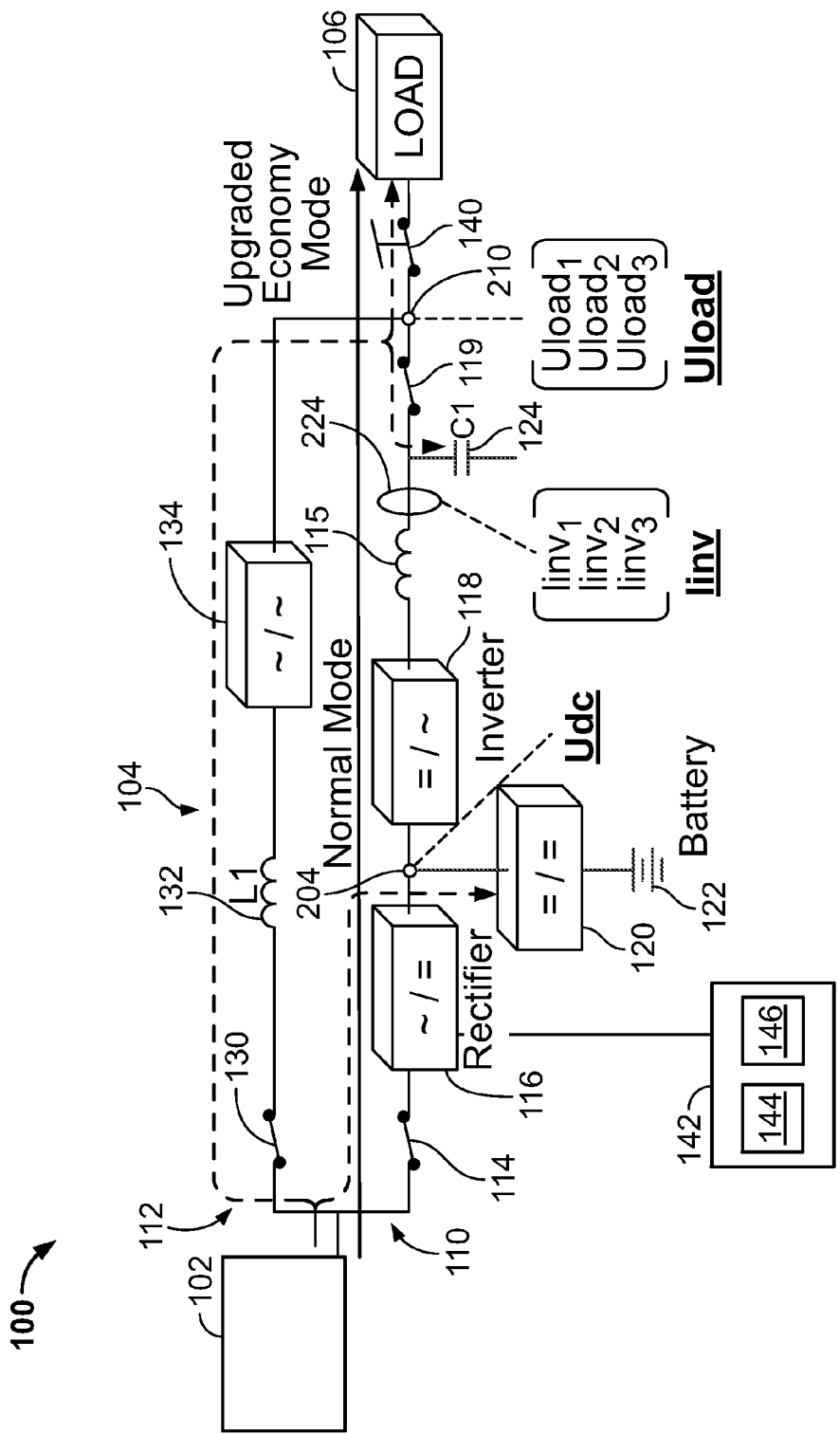
FIG. 1 is a schematic diagram of an exemplary power system.

FIG. 1 is a schematic diagram of an exemplary power system 100 that includes a utility 102, a multi-mode UPS 104, and at least one load 106. Multi-mode UPS 104 is operable in a first, normal, mode and a second, upgraded economy, mode, as described herein. Multi-mode UPS 104 facilitates delivering power from utility 102 to load 106. In the exemplary embodiment, multi-mode UPS 104 does not includes a transformer (i.e., multi-mode UPS 104 is transformerless). Alternatively, multi-mode UPS 104 may include a transformer. In the exemplary embodiment, system 100 includes one multi-mode UPS 104. Alternatively, system 100 may include a plurality of multi-mode UPSs 104 coupled in parallel.

As shown in FIG. 1, multi-mode UPS 104 includes a first, or double-conversion, path 110 in parallel with a second, or bypass, path 112. In the exemplary embodiment, first path 110 includes, in series, a first switch 114, an alternating current (AC) to direct current (DC) rectifier 116, a DC to AC inverter 118, an inductor 115 and a second switch 119. In the exemplary embodiment, rectifier 116 and inverter 118 are three-level converters. Alternatively, rectifier 116 and inverter 118 may be any converters that enable system 100 to function as described herein.

A DC to DC converter 120 and a battery 122 are coupled in parallel with inverter 118, and a capacitor 124 is coupled in parallel with second switch 119. Because multi-mode UPS 104 includes rectifier 116 and inverter 118, multi-mode UPS 104 may also be referred to as a double-conversion UPS. Second path 112 includes, in series, a third switch 130, a choke 132, and a semiconductor switching module (SSM) 134. In the exemplary embodiment, SSM is a thyristor-based component. Alternatively, SSM may be implemented using forced-commutation devices (e.g., an integrated gate-commutated thyristor (IGCT)). A fourth switch 140 facilitates selectively connecting load 106 to multi-mode UPS 104.

A controller 142 is communicatively coupled to multi-mode UPS 104 and controls operation of multi-mode UPS 104, as described herein. Controller 142 may include its own power system (not shown) such as a dedicated energy source (e.g., a battery). In some embodiments, controller 142 is coupled to a substitute controller (not shown) that may be used in the event that controller 142 fails. Controller 142 may control power distribution and management of system 100 over a relatively large geographic area.

In the exemplary embodiment, controller 142 is implemented by a processor 144 communicatively coupled to a memory device 146 for executing instructions. In some embodiments, executable instructions are stored in memory device 146. Alternatively, controller 142 may be implemented using any circuitry that enables controller 142 to control operation of multi-mode UPS 104 as described herein. For example, controller 142 may dynamically determine what power resources will be needed and at what performance level and environmental conditions (e.g., temperature, humidity, time of day, etc.) those power resources will need to operate. Controller 142 may perform dynamic monitoring to determine whether a load 106 is satisfied with the power delivered, and whether delivered power is free of harmonics, transients, etc. In some embodiments, dynamic monitoring may include tracking resource usage to determine how much current or voltage should be delivered. Controller 142 may also monitor and/or control rapidity (i.e., bandwidth) and inverter capability (e.g., overload, reactive power, active power) to facilitate ensuring reliability of system 100 and minimizing performance degradation of UPS 104.

Controller 142 may also include a state machine scheduler configured to selectively activate and deactivate power resources, set voltage and current levels, and/or take power saving actions (e.g., reducing current delivery). Controller 142 may also track characteristics (e.g., static allocation of power) of system 100 to determine whether one or more components of system 100 should be put on standby or whether power should be diverted.

In the exemplary embodiment, controller 142 performs one or more operations described herein by programming processor 144. For example, processor 144 may be programmed by encoding an operation as one or more executable instructions and by providing the executable instructions in memory device 146. Processor 146 may include one or more processing units (e.g., in a multi-core configuration). Further, processor 146 may be implemented using one or more heterogeneous processor systems in which a main processor is present with secondary processors on a single chip. As another illustrative example, processor 144 may be a symmetric multi-processor system containing multiple processors of the same type. Further, processor 144 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 144 causes controller 142 to operate multi-mode UPS 104, as described herein.

In the exemplary embodiment, memory device 146 is one or more devices that enable information such as executable instructions and/or other data to be stored and retrieved. Memory device 146 may include one or more computer readable media, such as, without limitation, dynamic random access memory (DRAM), static random access memory (SRAM), a solid state disk, and/or a hard disk. Memory device 146 may be configured to store, without limitation, application source code, application object code, source code portions of interest, object code portions of interest, configuration data, execution events and/or any other type of data.

Multi-mode UPS 104 has improved efficiency over at least some known double-conversion UPSs, as described herein. In the normal mode (shown by a solid line in FIG. 1), load 106 is fed through double-conversion path 110 (i.e., through both rectifier 116 and inverter 118). However, in the upgraded economy mode (UEM) (shown by a dashed line in FIG. 1), if an input power from utility 102 is within predetermined tolerances, load 106 is fed directly using bypass path 112. Further, as described herein, in the UEM mode, multi-mode UPS 104 facilitates optimizing the resulting current and/or voltage delivered to load 106 by using at least one of rectifier 116 and inverter 118 to provide reactive power compensation and/or damp potential oscillation/resonance phenomena. Further, at least one of rectifier 116 and inverter 118 may adjust an output current or compensate a voltage deviation when utility 102 is faulty, low, and/or disappears entirely.

In the UEM mode, inverter 118 is switched to a standby state, while rectifier 116 remains active to regulate the DC link and recharge battery 122. As shown in FIG. 1, in the UEM mode, capacitor 124 is energized by utility 102 via backfeed from an output of multi-mode UPS 104. Energizing capacitor 124 facilitates a relatively fast transfer to inverter 118 in case of disturbances in utility 102 that cause system 100 to switch from the UEM mode to the normal mode. However, maintaining capacitor 124 energized make have at least some drawbacks.

For example, the filter formed by capacitor 124 contributes with a load current to the UPS input current. Accordingly, even if load 106 has a unity power factors, a UPS input power factor could appear capacitive. Further, in low-load conditions, the UPS input power factor may drop substantially. Additionally, capacitor 124 is in parallel with load 106, and power from utility 102 may exhibit a series impedance that is primarily inductive. Accordingly, the combination of the series inductance and parallel capacitance yields an LC structure that includes capacitor 124 and choke 132. Although this combination provides filtering, it may get excited into resonance by higher-order harmonics present in the utility voltage and/or the load current. Further, this combination may cause a voltage rise such that the output voltage is higher than in a pure bypass operation where capacitor 124 is not energized.

Accordingly, in the exemplary embodiment, in the UEM mode, to revise the input and output characteristics while preserving efficiency of multi-mode UPS 104, either one of rectifier 116 and inverter 118 is left active, while the other of rectifier 116 and inverter 118 is switched to a standby state.

In at least some embodiments, a detector (not shown) coupled to controller 142 monitors system 100 to determine whether the output of multi-mode UPS 104 is capacitive, inductive, or resistive. Monitoring the output enables controller 142 to facilitate optimizing compensation for a voltage drop at the output of multi-mode UPS 104 when utility 102 is no longer supplying proper power. In such embodiments, controller 142 utilizes a predetermined set of filter coefficients to provide at least one of a virtual resistor, a virtual capacitor, and a virtual inductor to offset an effective impedance at the output to prevent resonant oscillations, provide a smoother output, and/or improve phase matching. As an example, controller 142 may drive rectifier 116 and/or inverter 118 to act as a virtual resistor placed in parallel with the converter to damp potential resonation, thereby performing active damping. Similarly, controller 142 may drive rectifier 116 and/or inverter 118 to act as a virtual inductor to offset capacitive current of capacitor 124, thereby performing reactive power compensation.

Figure 2:
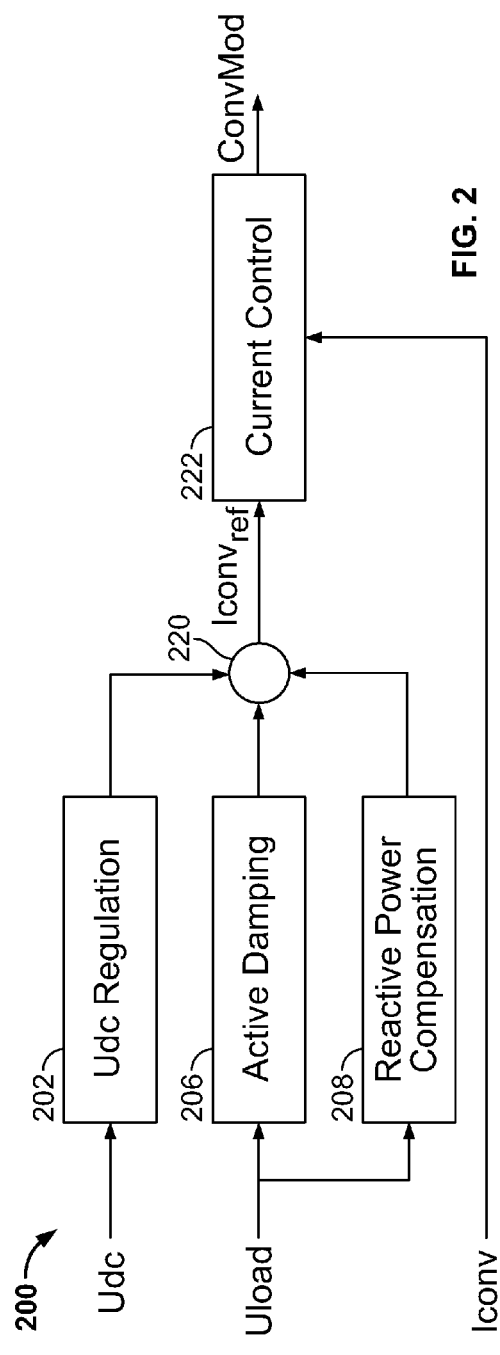
FIG. 2 is a block diagram of an exemplary control algorithm that may be used with the system shown in FIG. 1.

In the exemplary embodiment, controller 142 is coupled to rectifier 116 and controls rectifier 116 to perform at least one of DC voltage regulation, reactive power compensation, and active damping. FIG. 2 is block diagram of a current control algorithm 200 that may be executed using, for example controller 142. As shown in FIG. 2, a DC voltage regulation block 202 receives a DC voltage value, Udc. The DC voltage value is measured at a first point 204 (shown in FIG. 1) located between rectifier 116 and inverter 118. An active damping block 206 and a reactive power compensation block 208 both receive a load voltage value, Uload. The load voltage value is measured at a second point 210 (shown in FIG. 1) at the output of multi-mode UPS 104. In the exemplary embodiment, active damping block 206 and reactive power compensation block 208 are implemented in the d-q reference frame. Alternatively, they may be implemented in the alpha-beta reference frame or the a-b-c reference frame.

The outputs of DC voltage regulation block 202, active damping bock 206, and reactive power compensation block 208 are combined at a node 220 to generate a total reference current, $Iconv_{ref}$. In the exemplary embodiment, a current control block 222 of current control algorithm receives the total reference current and a converter current, Iconv. When rectifier 116 is activated, the converter current Iconv may be measured at an input of rectifier 116 (i.e., between first switch 114 and rectifier 116. In embodiments wherein inverter 118 is activated, the converter current Iconv (shown as Iinv in FIG. 1) may be measured for example, using a current sensor 224. Based on the total references current and the converter current, controller 142, at current control block 222, generates a modulation signal, ConvMod, that modulates the converter (i.e., rectifier 116 in this embodiment).

For example, control algorithm 200 may be implemented in the d-q reference frame. The reference current $Iconv_{ref}$ may then be converted back to the a-b-c reference frame, and current control block 22 may represent a controller based on a state-variable model of the controlled system 100. Alternatively, the d-q components of the reference current $Iconv_{ref}$ may be converted to the alpha-beta reference frame, and converter switches may then be driven using a Space Vector Modulation (SVM) approach.

For the DC voltage regulation functionality, DC voltage regulation block 202 regulates the voltage for the AC to DC conversion performed by rectifier 116. In the exemplary embodiment, for the reactive power compensation functionality, the compensation of the reactive power is based on the compensation of the internal filter capacitive current (i.e., the current through capacitor 124), as compensation of the load reactive power may affect efficiency of multi-mode UPS 104. The reactive power compensation functionality may change the phase of the current.

Figure 3:
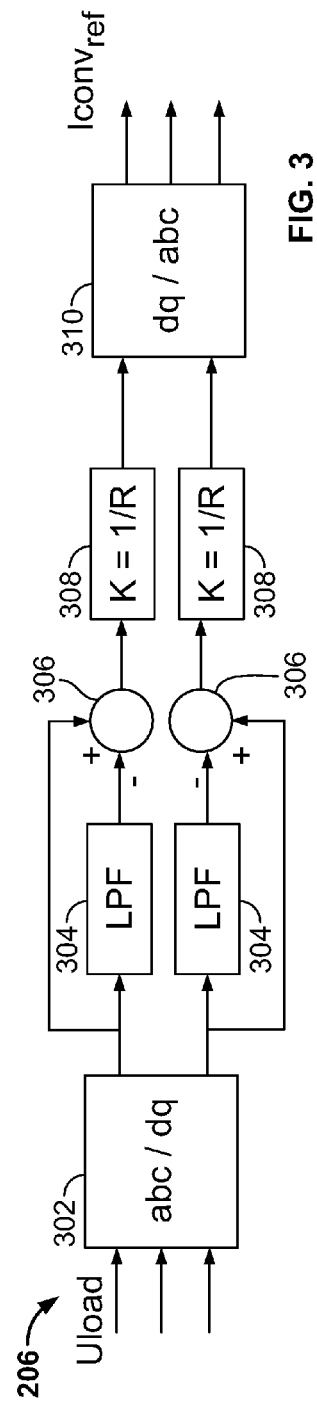
FIG. 3 is a block diagram of an active damping block that may be used with the algorithm shown in FIG. 2.

Active damping operates the converter (i.e., rectifier 116 in this embodiment) to act as a virtual resistor placed in parallel with the converter to damp potential resonant oscillation effects. FIG. 3 is a block diagram of active damping block 206 (shown in FIG. 2). By improving overall system stability, active damping also improves a harmonic content of the current.

As shown in FIG. 3, a first transformation block 302 transforms the signal from a three-phase to a two-phase frame. Each phase is then high-pass filtered by passing the signal through a low-pass filter 304 and subtracting the low-pass component from the original signal at a summing block 306. Each phase is then passed through a virtual resistor 308. Virtual resistor 308 behaves like an RLC circuit when combined with the LC structure, providing resistive loss to damp out high frequency components at the output of multi-mode UPS 104. The phases are then passed through a second transformation block 310 that transforms the signal back to a three-phase frame.

Figure 4A:
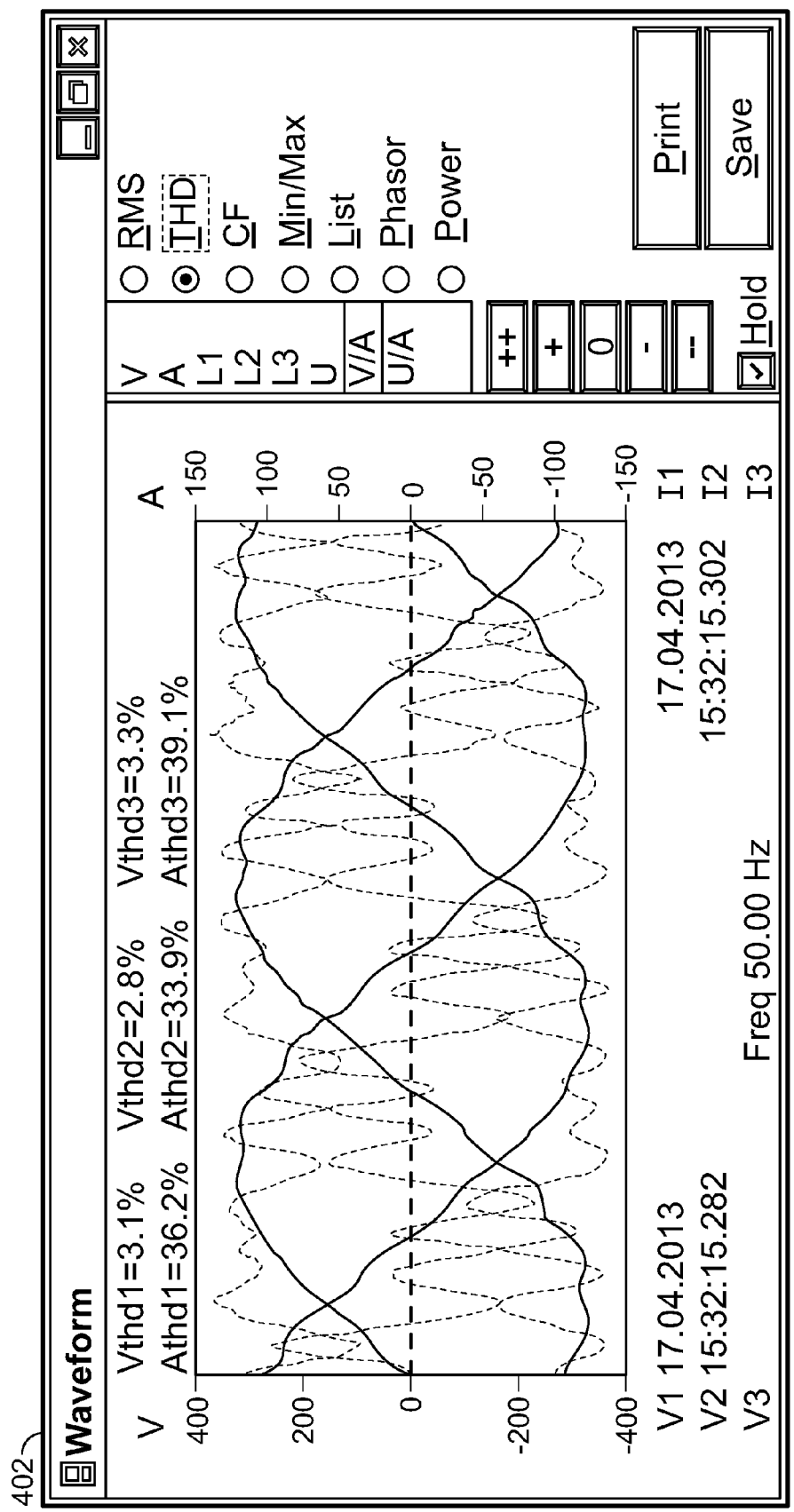
FIG. 4A is a graph demonstrating the performance of a system without an upgraded economy mode or active economy mode
Figure 4B:
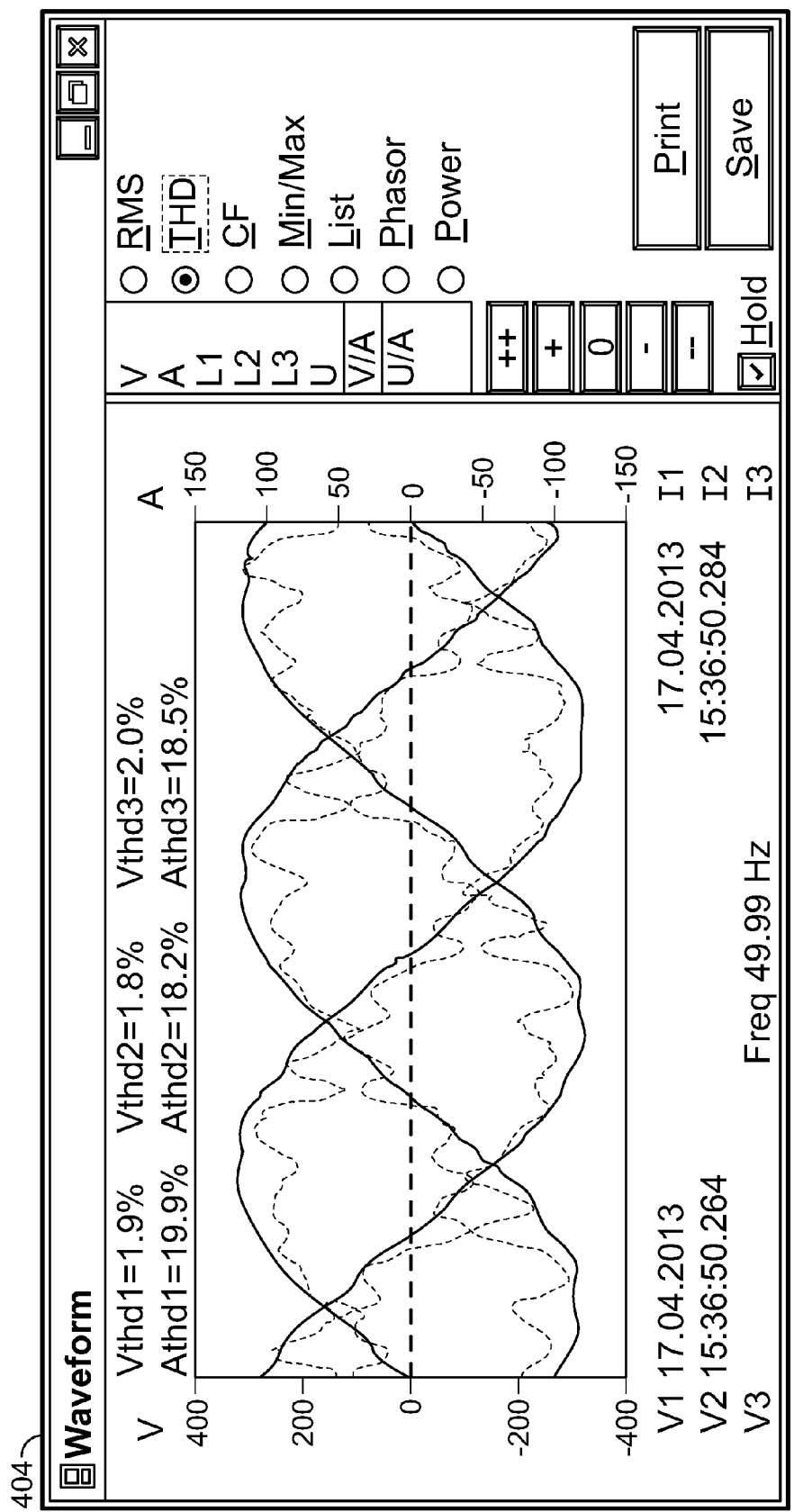
FIG. 4B is a graph demonstrating the performance of a system in an upgraded economy mode or active economy mode.

FIG. 4A shows the performance of a power system in an economy mode without utilizing rectifier 116 and/or inverter 118 to perform at least one of DC voltage regulation, reactive power compensation, and active damping. In this example, the system is tuned to a high-order harmonic ($11^{th}$), and both the voltage and current component show a substantial $11^{th}$ harmonic content. FIG. 4B shows the performance of the system 100 with rectifier 116 and/or inverter 118 performing at least one of DC voltage regulation, reactive power compensation, and active damping. Here, the improvements in phase displacement and distortion reduction are clear. Notably, both UEM (Upgraded Economy Mode—with rectifier 116 as the operational converter) and AEM (Active Economy Mode—with inverter 118 as the only operation converter, as described below) both provide the benefits shown in FIG. 4B.

Figure 5:
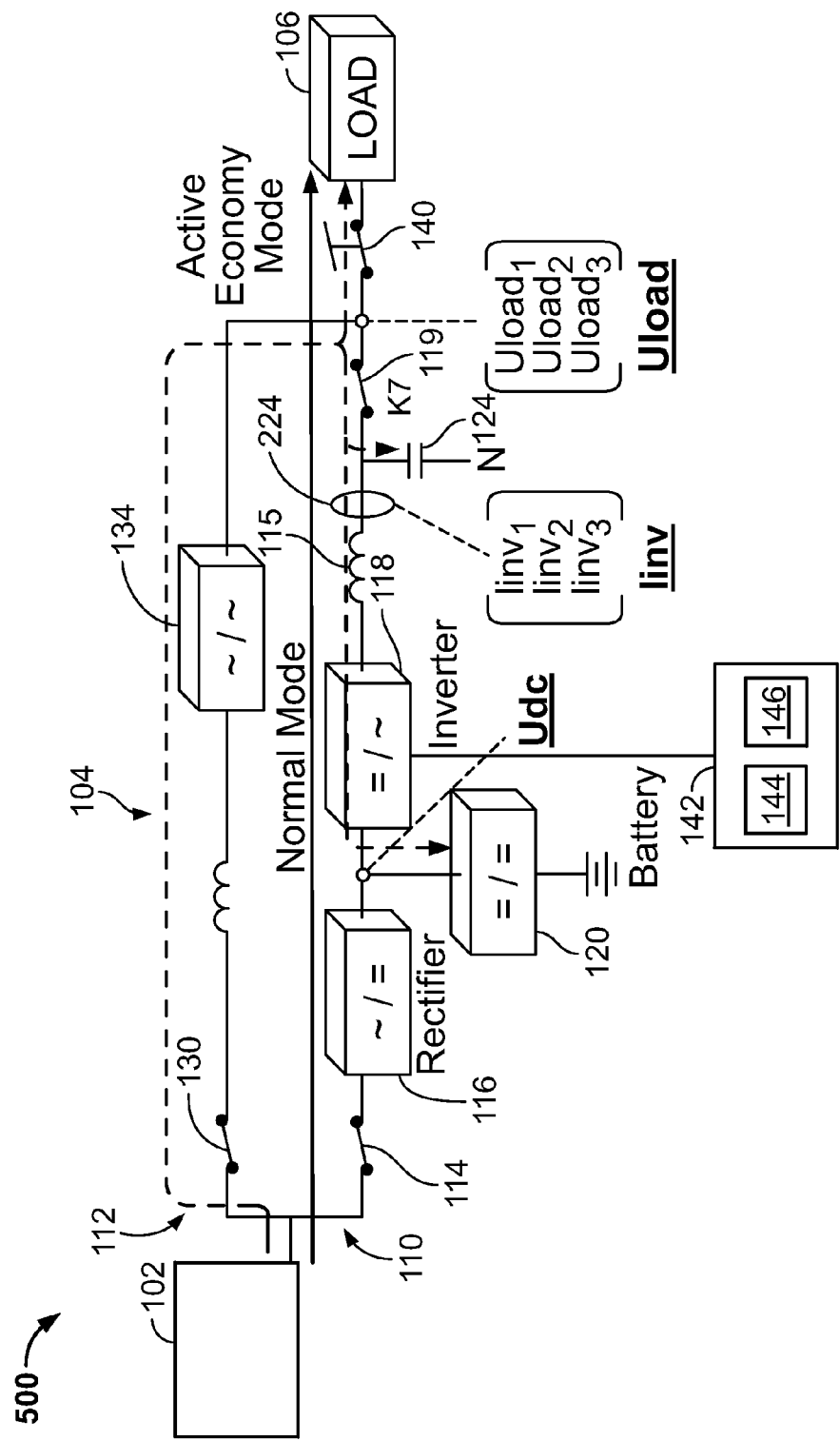
FIG. 5 is a schematic diagram of an alternative embodiment of the system shown in FIG. 1.

FIG. 5 is a schematic diagram of alternative embodiment 500 of system 100. Unless otherwise indicated, components of system 500 are substantially similar to those of system 100. System 500 is capable of operation in a normal mode and an active economy mode (AEM). In the normal mode (shown by a solid line in FIG. 5) of system 500, load 106 is fed through double-conversion path 110 (i.e., through both rectifier 116 and inverter 118). However, in the AEM mode (shown by a dashed line in FIG. 5), if an input power from utility 102 is within predetermined tolerances, load 106 is fed directly using bypass path 112. In the AEM mode, rectifier 116 is switched to a standby state, while inverter 118 remains active. In the exemplary embodiment, inverter 118 is energized via a backfeed through a contactor (not shown). Alternatively, the contactor may be replaced with a static switch.

Similar to rectifier 116 in the UEM mode described above, in the AEM mode, controller 142 controls inverter 118 to provide at least one of reactive power compensation, DC voltage regulation, and active damping. That is, this functionality may be performed by either of the two converters (i.e., rectifier 116 and inverter 118) as long as they are implemented as active converters. These modes (UEM and AEM) offer improved input characteristics (in terms of reactive power and current distortion) for multi-mode UPS 104 and offer improved output characteristics (in terms of voltage stability and reduced distortion). As described above, FIG. 4B is a graph 404 demonstrating performance of system 500 under the AEM mode.

In some embodiments, rectifier 116 and inverter 118 both remain active in an economy mode. This facilitates regulating the DC link and performing load voltage and current conditioning using active damping or a combination of active damping and filtering. In such embodiments, an output impedance of multi-mode UPS 104 is detected, and rectifier 116 and inverter 118 are both controlled (e.g., using controller 142) to offset any impedance at the output of multi-mode UPS 104 that would form an oscillation. For example, a virtual resistor may be formed using the path through inverter 118.

In other embodiments, rectifier 116 and inverter 118 may be thought of as being redundant active converters. That is, if one of rectifier 116 and inverter 118 fails during an economy mode, the economy mode may be maintained with the other of rectifier 116 and inverter 118.

Figure 6:
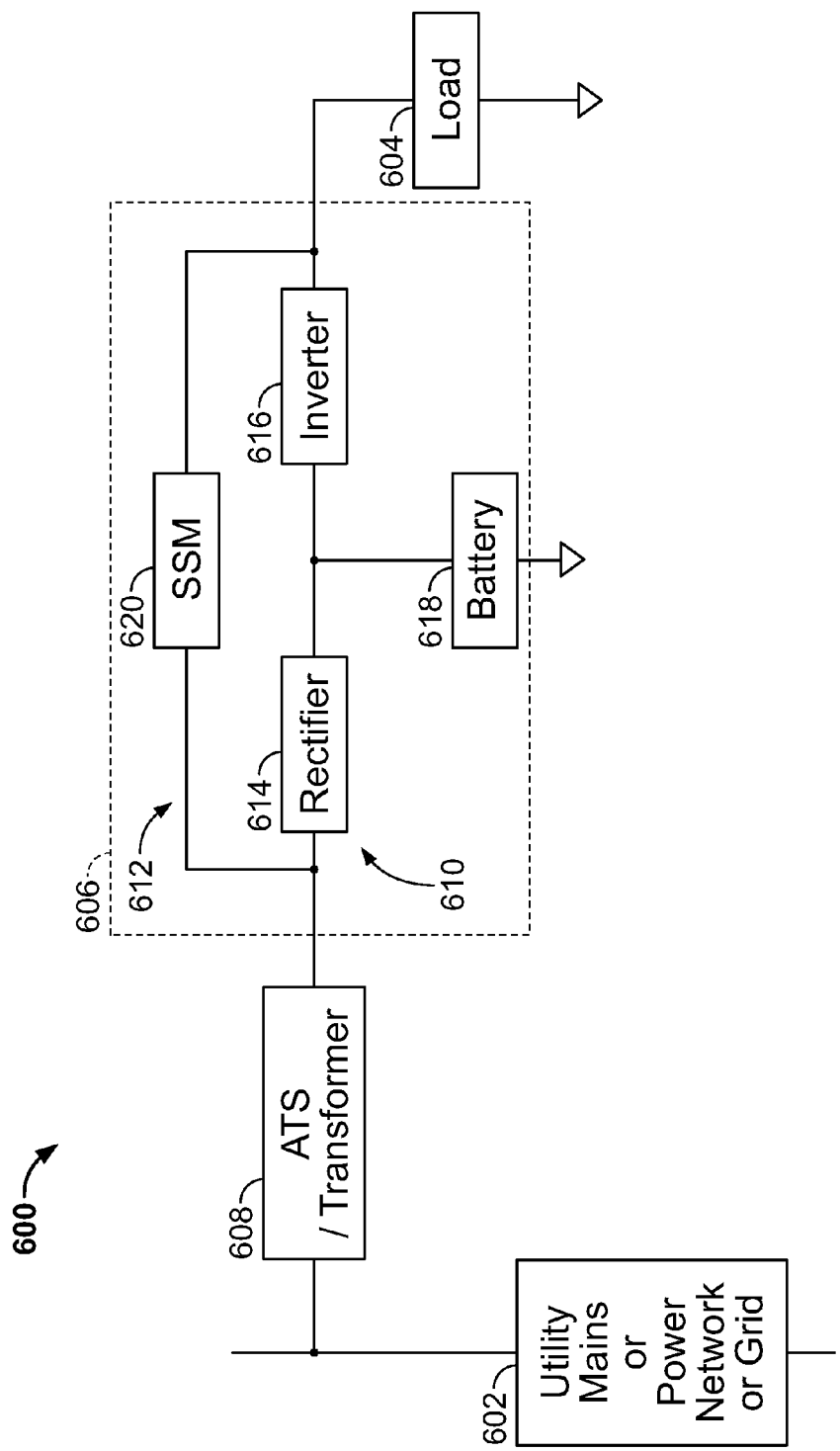
FIG. 6 is a schematic diagram of an exemplary power system.

FIG. 6 is a schematic diagram of an exemplary power system 600 that supplies power from a grid 602 (e.g., a utility mains or power network) to a load 604 through a UPS 606. UPS 606 may be, for example, multi-mode UPS 104 (shown in FIG. 1). Load 604 may be, for example, a data center or a computer center for operating and managing a telecommunications system. An intermediate device 408 (e.g., an automatic transfer switch or a transformer) is coupled between grid 602 and UPS 606. In additional to normal UPS functionalities, UPS 606 provides grid interactive functions. For example, converters in UPS 606 may provide active and/or reactive power to grid 602 from UPS 606. In another example, the converters are operable to provide a controllable load that grid 602 sees. In yet another example, UPS 606 implements a peak shaving operating mode in which a critical load of UPS 606 is supplied from an internal energy storage device (e.g., a battery) of UPS 606 when energy costs are relatively high. The energy storage device is then recharged during low rate periods.

In data center architectures, because there may be several data centers in a populated region, system 100 may be utilized to supply power back to grid 602 (e.g., to stabilize or balance grid 602 when grid 602 or another power source encounters problems or is low). UPS 606 may be operable to supply power back to grid 602 in other applications as well. For example, UPS 606 may be operable to supply power back to a relatively small grid for a hospital or university.

As shown in FIG. 6, in the exemplary embodiment, similar to multi-mode UPS 104, UPS 606 is a double-conversion UPS that includes a first path 610 in parallel with a second path 612. First path 610 includes a rectifier 614 in series with an inverter 616, and a battery 618 in parallel with inverter 616. Second path 612 includes an SSM 620. Rectifier 614 is reversible or has a reversible mode of operation in the exemplary embodiment. Further, in the exemplary embodiment, rectifier 614 is a four quadrant voltage source converter.

Under normal load conditions, UPS 606 operates as described above in reference to FIGS. 1-5 to provide improved current and voltage to load 604. In the embodiment shown in FIG. 6, second path 612 and SSM 620 provide a bypass mode that bypasses operation of rectifier 614 and inverter 616.

As described above, UPS 606 may be utilized to provide power back to grid 602. More specifically, under some power source conditions, battery 618 supplies power to grid 602 through rectifier 614. At least one of active and reactive power is supplied to grid 602. By controlling a phase of injected current with respect to a grid voltage, rectifier 614 can inject a combination of active and reactive power into grid 602.

Figure 7:
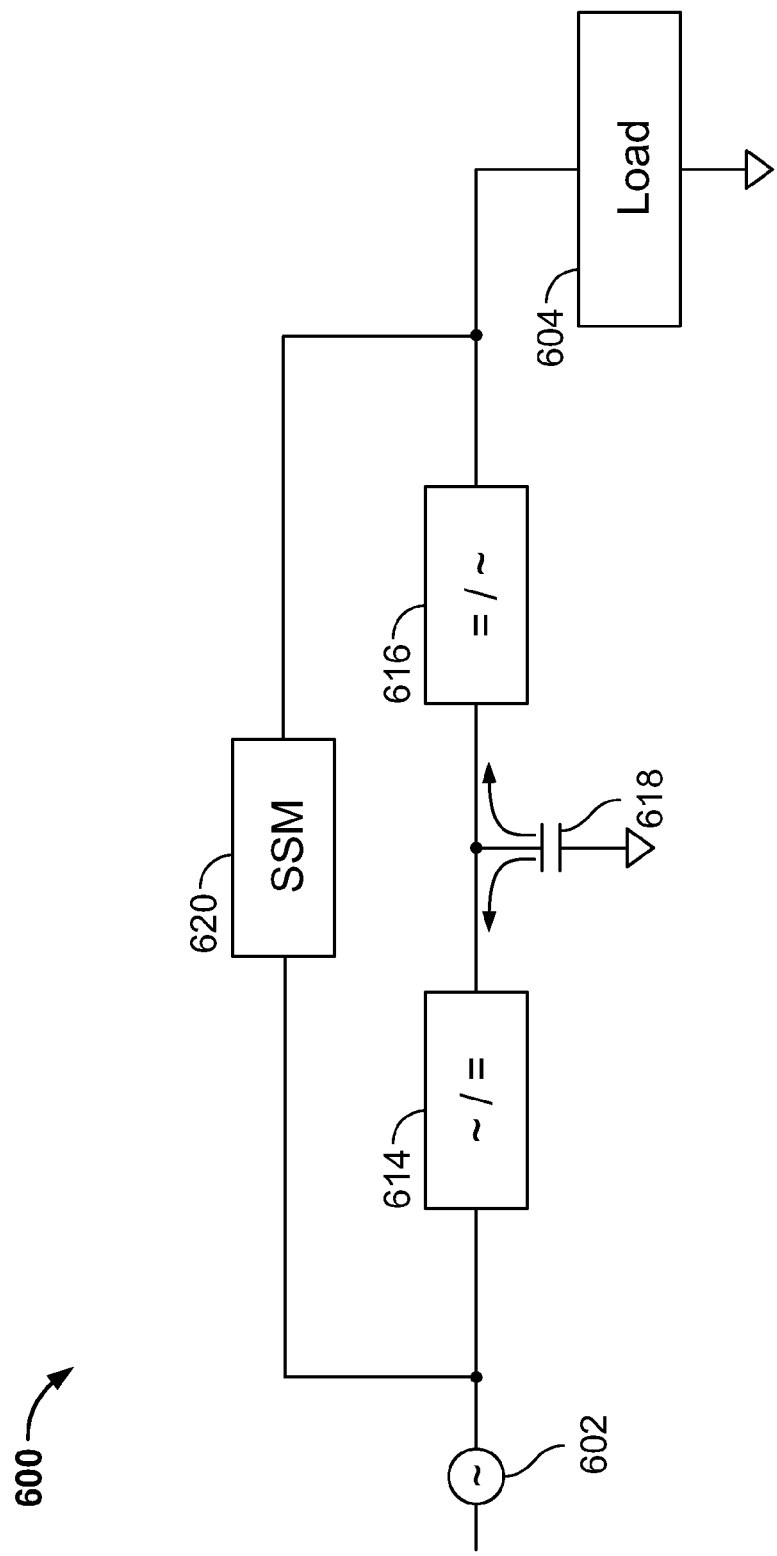
FIG. 7 is a simplified schematic diagram of the system shown in FIG. 6.

To supply power back to grid 602, in the exemplary embodiment, battery 618 is a rechargeable sodium battery capable of continuous charge-discharge-cycling. Battery 618 remains relatively unaffected by an ambient temperature, and is relatively compact. Alternatively, battery 618 may be any energy storage device that enables system 600 to function as described herein. The cycling of battery is controller by a controller (not shown in FIG. 6). FIG. 7 is a simplified schematic diagram of system 600. As shown in FIG. 7, battery 618 may provide power to grid 602 through rectifier 614, and may also provide power to load 604 through inverter 616.

Figure 8:
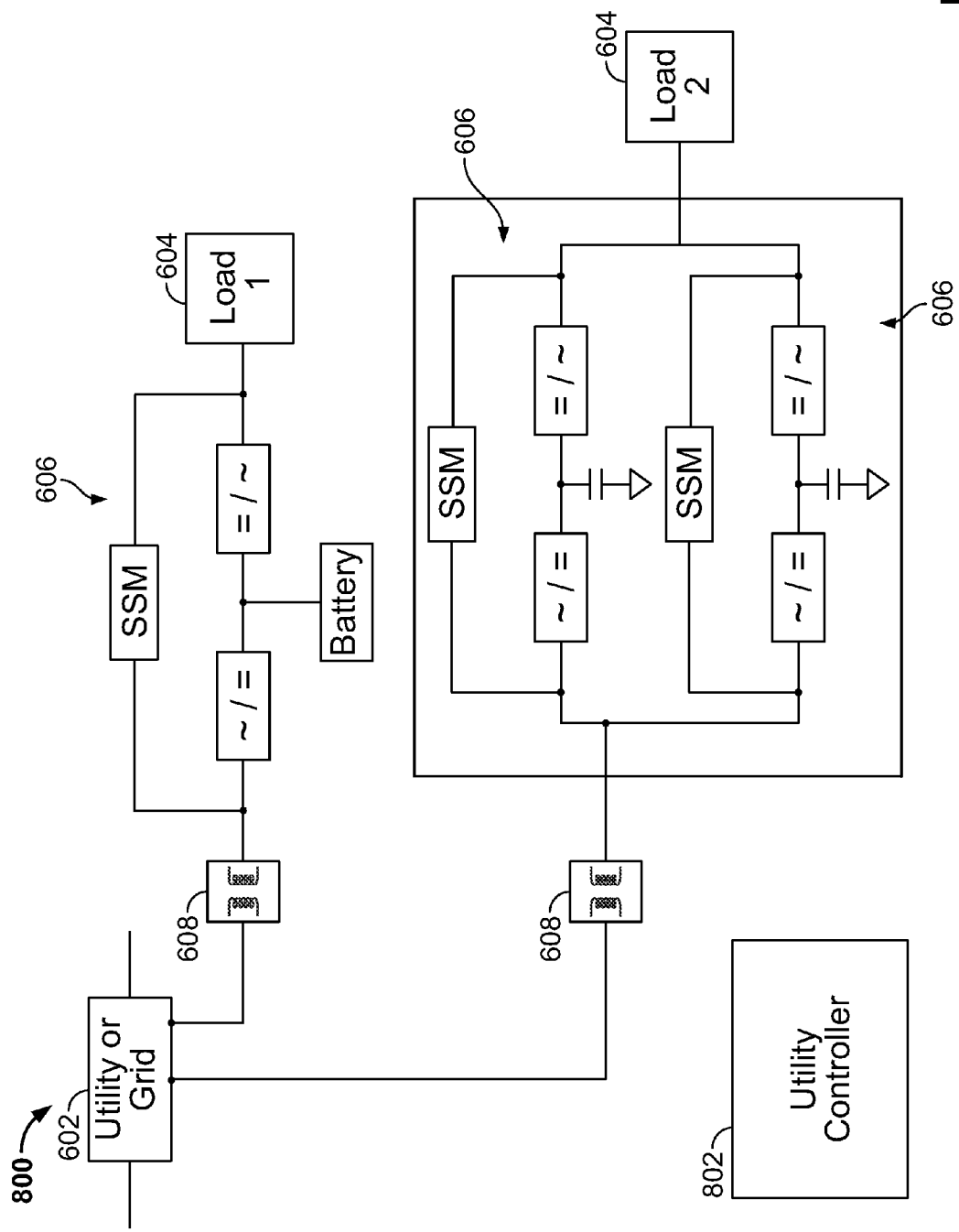
FIG. 8 is a schematic diagram of an alternative embodiment of the system shown in FIG. 6.

FIG. 8 is a schematic diagram of an alternative embodiment 800 of power system 600. Unless otherwise indicated, components of system 800 are substantially similar to those of system 600. As shown in FIG. 8, system 800 includes a plurality of UPSs 606, some of which are connected in parallel. All UPSs 606 are sourced by grid 602.

In the exemplary embodiment, synchronization and/or powerbus monitoring of each UPS 606 is controlled by a master controller 802. Master controller 602 monitors which UPSs 606 are able to provide power back to grid 602, and enables those UPSs 606 to provide power back to grid 602 when appropriate. Master controller 602 is substantially similar to controller 142 (shown in FIG. 1). Alternatively, a local controller may assert that it is the local master, and the local controller controls UPSs 606 associated with the local controller to supply power back to grid 602 through their respective rectifiers 614.

Figure 9:
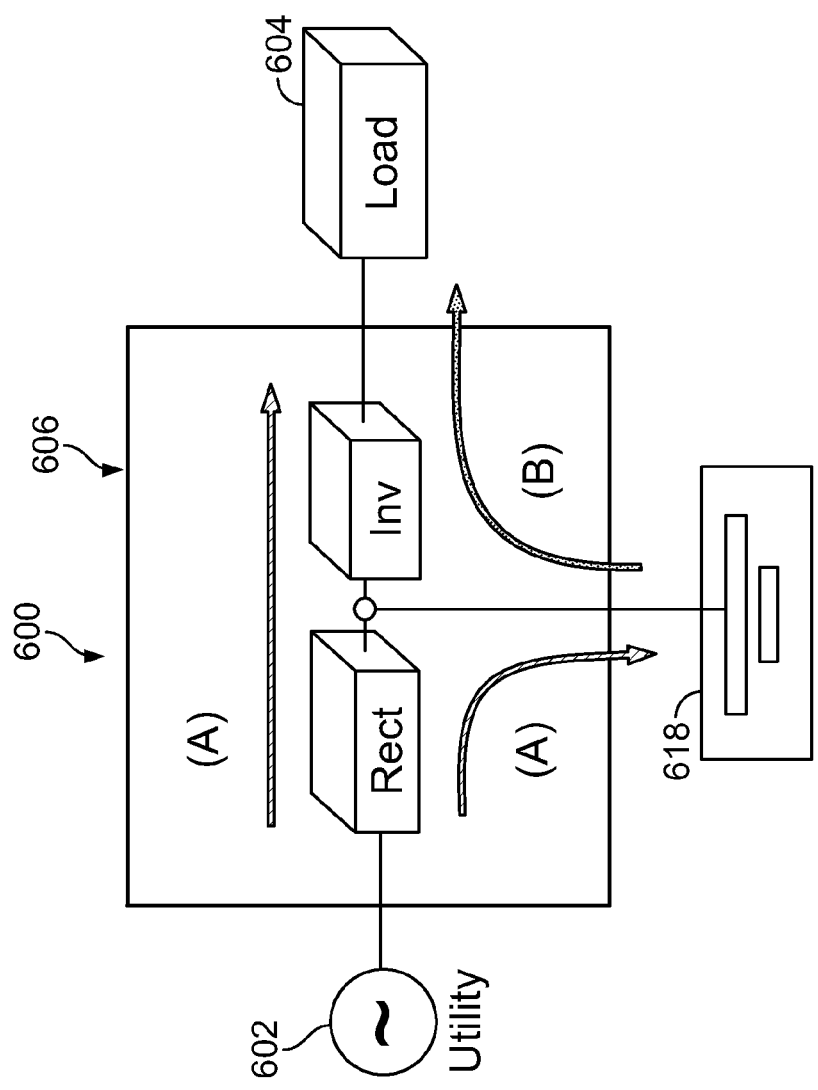
FIG. 9 is a schematic diagram of the system shown in FIG. 6 operating in a peak shaving mode.
Figure 9:
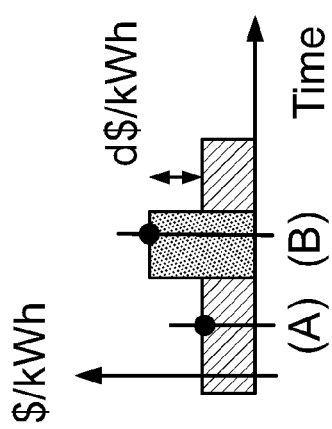

FIG. 9 is a schematic diagram of system 600 in a peak shaving mode in which load 604 is supplied power from battery 618. Peak shaving mode may be implemented, for example, when the cost of energy from grid 602 is relatively high. Accordingly, cost savings may realized by supplying power to load 604 from battery 618 instead of grid 602. During low rate periods, when the cost of energy from grid 602 is lower, battery 618 is recharged by receiving power from grid 602 through rectifier 614. For example, as shown in FIG. 9, in an (A) state, the cost of energy is relatively low, and power is provided from grid 602 to battery 618 and to load 604. In contrast, in a (B) state, the cost of energy is relatively high, and load 604 receives power from battery 618.

Battery 618 is sized and configured to provide power during typical UPS autonomy (e.g., in situations where grid 602 fails), as well as during the peak shaving mode. The economical benefits of the peak shaving mode depends on the difference between the peak rate and normal rate for power from grid 602, the daily time length of the peak shaving mode, and any increased costs of the battery 618 to enable the peak shaving mode functionality. To switch between the normal mode and the peak shaving mode, a controller (not shown) coupled to UPS 606 may compare the current energy rate to the normal energy rate to determine whether the peak shaving mode should be activated. For example, UPS 600 may switch to a peak shaving mode when the current energy rate exceeds a predetermined rate. The controller is substantially similar to controller 142 (shown in FIG. 1).

In some applications, to facilitate minimizing a size of grid 602, a "bottle feeding" approach is implemented, in which grid 602 delivers constant power twenty four hours a day to connected systems (i.e., UPSs 606). Any excess power not consumed by loads 604 is rectified using an associated rectifier 614 and stored in an associated battery 618. Accordingly, each UPS 606 may provide power from its associated battery 618, depending on requirements of the associated load 604.

As compared to at least some known power systems, the systems and methods described herein provide increased functionality as compared to at least some known UPSs. The embodiments described herein utilize a grid interactive UPS to balance an input power source (e.g., a grid) and/or provide power to the input power source. Converters in the grid interactive UPS may also provide a controllable load that the input power source sees.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A grid interactive uninterruptible power supply (UPS) comprising:
   a first path comprising:
      a rectifier;
      an inverter coupled in series with said rectifier; and
      a battery coupled in parallel with said inverter; and
   a second path in parallel with said first path, wherein said grid interactive UPS is operable to supply power from said battery to a grid coupled to an input of said grid interactive UPS, wherein said grid interactive UPS is operable in a peak shaving operating mode in which said battery supplies power to a load coupled to an output of said grid interactive UPS, wherein said grid interactive UPS is configured to activate the peak shaving operating mode in response to a control signal received from a controller that is generated in response to determining that a present energy rate of the grid exceeds a predetermined threshold energy rate, and wherein said grid interactive UPS is further configured to selectively drive one of the rectifier or the inverter to operate as a virtual resistor to provide active damping of resonant oscillation effects while concurrently placing the other of the rectifier or the inverter in a standby state.

2. A grid interactive UPS in accordance with claim 1, wherein said battery is configured to be recharged by receiving power from the grid.

3. A grid interactive UPS in accordance with claim 1, wherein said second path comprises a semiconductor switching module.

4. A grid interactive UPS in accordance with claim 1, wherein said battery is a rechargeable sodium battery.

5. A grid interactive UPS in accordance with claim 1, wherein said second path is operable as a bypass path that bypasses operation of said rectifier and said inverter.

6. A grid interactive UPS in accordance with claim 1, wherein said rectifier is configured to inject at least one of active and reactive power into the grid.

7. A power system comprising:
   a grid;
   a load; and
   at least one grid interactive uninterruptible power supply (UPS) coupled between said grid and said load, said at least one grid interactive UPS comprising:
      a first path comprising:
         a rectifier;
         an inverter coupled in series with said rectifier; and
         a battery coupled in parallel with said inverter; and
      a second path in parallel with said first path, wherein said at least one grid interactive UPS is operable to supply power from said battery to said grid and supply power from said battery to said load in a peak shaving operating mode; and
   a controller in communication with said at least one grid interactive UPS, said controller operable to:
      compare a present energy rate of said grid to a predetermined threshold energy rate;
      cause said at least one grid interactive UPS to activate the peak shaving operating mode when the present energy rate exceeds the predetermined threshold energy rate; and
      selectively drive one of the rectifier or the inverter to operate as a virtual resistor to provide active damping of resonant oscillation effects while concurrently placing the other of the rectifier or the inverter in a standby state.

8. A power system in accordance with claim 7, wherein said battery is configured to be recharged by receiving power from said grid.

9. A power system in accordance with claim 7, wherein said second path comprises a semiconductor switching module.

10. A power system in accordance with claim 7, wherein said battery is a rechargeable sodium battery.

11. A power system in accordance with claim 7, wherein said second path is operable as a bypass path that bypasses operation of said rectifier and said inverter.

12. A power system in accordance with claim 7, wherein said rectifier is configured to inject at least one of active and reactive power into said grid.

13. A power system in accordance with claim 7, wherein said at least one grid interactive UPS comprises a plurality of grid interactive UPSs.

14. A method of operating a power system comprising a grid interactive uninterruptible power supply (UPS) coupled between a grid and a load, wherein the grid interactive UPS includes a first path including a rectifier, an inverter coupled in series with the rectifier, and a battery coupled in parallel with the inverter, and a second path in parallel with the first path, the method comprising:
   comparing a present energy rate of the grid to a predetermined threshold energy rate using a controller in communication with the grid interactive UPS;
   operating the grid interactive UPS in a peak shaving operating mode when the present energy rate exceeds the predetermined threshold energy rate, wherein the battery supplies power to a load in the peak shaving operating mode;
   supplying power from the battery to the grid; and
   selectively driving one of the rectifier or the inverter to operate as a virtual resistor to provide active damping of resonant oscillation effects while concurrently placing the other of the rectifier or the inverter in a standby state.

15. A method in accordance with claim 14, further comprising recharging the battery by receiving power from the grid.

16. A method in accordance with claim 14, wherein coupling a grid interactive UPS comprises coupling a grid interactive UPS that includes a rechargeable sodium battery.

17. A method in accordance with claim 14, further comprising injecting at least one of active and reactive power into the grid using the rectifier.

18. A grid interactive UPS in accordance with claim 1, wherein to selectively drive one of the rectifier or the inverter to operate as a virtual resistor to provide active damping of resonant oscillation effects comprises to drive one of the rectifier or the inverter to provide active damping of resonant oscillation effects produced by a capacitor connected in parallel with the load coupled to the output of the grid interactive UPS.

19. A power system in accordance with claim 7, wherein to selectively drive one of the rectifier or the inverter to operate as a virtual resistor to provide active damping of resonant oscillation effects comprises to drive one of the rectifier or the inverter to provide active damping of resonant oscillation effects produced by a capacitor connected in parallel with the load.

20. A method in accordance with claim 14, wherein selectively driving one of the rectifier or the inverter to operate as a virtual resistor to provide active damping of resonant oscillation effects comprises driving one of the rectifier or the inverter to provide active damping of resonant oscillation effects produced by a capacitor connected in parallel with the load.

* * * * *